(12) United States Patent
Sanders et al.

(10) Patent No.: US 9,458,707 B2
(45) Date of Patent: Oct. 4, 2016

(54) INJECTION SYSTEM FOR ENHANCED OIL RECOVERY

(71) Applicant: Dow Global Technologies LLC, Midland, MI (US)

(72) Inventors: Aaron W. Sanders, Missouri City, TX (US); Terry A. Mann, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 302 days.

(21) Appl. No.: 13/692,501

(22) Filed: Dec. 3, 2012

(65) Prior Publication Data

US 2014/0151050 A1 Jun. 5, 2014

(51) Int. Cl.
*E21B 43/25* (2006.01)
*E21B 43/16* (2006.01)
*E21B 21/06* (2006.01)

(52) U.S. Cl.
CPC ........... *E21B 43/166* (2013.01); *E21B 21/062* (2013.01); *E21B 43/164* (2013.01); *Y02P 90/70* (2015.11); *Y10T 137/86027* (2015.04)

(58) Field of Classification Search
CPC .................................. C09K 8/00; B65D 88/54
USPC ..................... 137/897; 366/167.1; 166/305.1
See application file for complete search history.

(56) References Cited

U.S. PATENT DOCUMENTS

| | | | |
|---|---|---|---|
| 3,065,790 A * | 11/1962 | Holm | 166/402 |
| 3,830,472 A * | 8/1974 | Janhsen et al. | 366/227 |
| 4,763,730 A | 8/1988 | Suzuki | |
| 5,033,547 A * | 7/1991 | Schievelbein | 166/403 |
| 5,358,046 A * | 10/1994 | Sydansk et al. | 166/275 |
| 5,566,760 A * | 10/1996 | Harris | 166/308.6 |
| 5,632,865 A * | 5/1997 | Stein et al. | 203/6 |
| 5,789,505 A | 8/1998 | Wilkinson et al. | |
| 6,318,464 B1 | 11/2001 | Mokrys | |
| 6,686,438 B1 | 2/2004 | Beckman et al. | |
| 6,702,011 B2 | 3/2004 | Crawford et al. | |
| 7,137,569 B1 * | 11/2006 | Miller et al. | 239/8 |
| 2002/0041807 A1 * | 4/2002 | Forthuber et al. | 417/22 |
| 2006/0280027 A1 * | 12/2006 | Fulton | 366/101 |
| 2008/0066918 A1 * | 3/2008 | Smith | 166/308.2 |

(Continued)

FOREIGN PATENT DOCUMENTS

| | | |
|---|---|---|
| WO | 2005/042908 A2 | 5/2005 |
| WO | 2007/011812 A1 | 1/2007 |

(Continued)

OTHER PUBLICATIONS

Xing et al. CO2-soluble surfactants for improved mobility control (Apr. 2010).*

(Continued)

*Primary Examiner* — Angela M DiTrani
*Assistant Examiner* — Avi Skaist
(74) *Attorney, Agent, or Firm* — Akerman LLP

(57) ABSTRACT

A method of enhancing oil recovery by providing a mobile surfactant injection system including a storage tank, means for injecting surfactant into a supercritical $CO_2$ stream, and a feedback control for maintaining a constant concentration of surfactant in a gas stream, the method including the steps of creating a fluid comprising the surfactant and the injection gas, and injecting the fluid into the oil field strata.

3 Claims, 6 Drawing Sheets

(56) References Cited

U.S. PATENT DOCUMENTS

| | | |
|---|---|---|
| 2008/0087611 A1* | 4/2008 | Tomley .................. 210/749 |
| 2009/0073800 A1* | 3/2009 | Tarmann et al. ......... 366/153.1 |
| 2009/0200011 A1* | 8/2009 | Decker .................. 166/90.1 |
| 2011/0017456 A1 | 1/2011 | Koide et al. |
| 2011/0139762 A1* | 6/2011 | Hebblethwaite ......... 219/213 |

FOREIGN PATENT DOCUMENTS

| | | |
|---|---|---|
| WO | 2008/071808 A1 | 6/2008 |
| WO | 2008/081048 A2 | 7/2008 |
| WO | 2010/044818 A1 | 4/2010 |

OTHER PUBLICATIONS

Gas & Oilfield Barrel Tanks. Highland Tank brochure.*
Sentrynet 3 Brochure, Baker Hughes (2008).*
Fundamentals of Mass Flow Control, Advanced Energy (2005).*
Internation Search Report for PCT US2011/039119.*
Viet W.Le, SPE, Quoc P. Nguyen, SPE, The University of Texas at Austin, and Aaron W. Sanders, The Dow Chemical Company, A Novel Foam Concept with CO2 Dissolved Surfactants, SPE, Apr. 19, 2008, pp. 1-15, vol. SPE113370, XP007919773.
Xing et al. (Society of Petroleum Engineers, SPE 129907, presented at the 2010 SPE Improved Oil Recovery Symposium, Tulsa, OK, Apr. 24-28, 2010).

* cited by examiner

INJECTION SYSTEM FOR ENHANCED OIL RECOVERY

BENEFIT CLAIMS

This application is a US National Stage of International Application No. PCT/US2011/039119 filed 3 Jun. 2011, which claims the benefit of 61/351,506 filed 4 Jun. 2010.

FIELD OF THE INVENTION

The invention relates generally to mobile systems and methods for delivering additives to high pressure gas lines used in enhanced oil recovery (EOR). More specifically, the invention relates to mobile systems and methods for the dispensing of surfactant into high pressure $CO_2$ streams used for enhanced oil recovery applications.

BACKGROUND OF THE INVENTION

Enhanced oil recovery (EOR) has become a significant industry practice in the last twenty years. Of all the known EOR techniques, $CO_2$ injection is more popular due to high displacement efficiency of $CO_2$. Unfortunately even when in a supercritical state, $CO_2$ has a low viscosity and suffers from poor conformance, mobility, and ultimately low sweep efficiency. One method that has been developed to alleviate this problem is the use of surfactants to emulsify the supercritical $CO_2$ in water (brine) as an emulsion. This creates an apparent viscosity in the $CO_2$ and improves the mobility and conformance of the $CO_2$ as it propagates through the strata in an oil field.

Although much work has been done to determine the best surfactants and injection strategies, little has been published on how to implement supercritical $CO_2$ surfactant foam solutions. Several key problems arise in the economical implementation of these techniques. For instance, one method of implementing this solution is to utilize a $CO_2$ soluble surfactant injected directly into the $CO_2$ line. Most $CO_2$ injection lines are maintained at 1500-2500 psi and have variable rates of flow. A complex high-pressure pump and delivery system is needed to accommodate these variables. Further given that these surfactants are generally added on an alternating cycle, the system is only utilized for short amounts of time on a given well. This adds to the complexity of the operation, and is also an inefficient, i.e. a costly, application of equipment.

Some examples of prior processes and machines include WO 2008081048 which describes a system for another form of enhanced oil recovery, alkaline surfactant polymer (ASP) flooding. A new grinding apparatus for improving the dissolution time of the polymer is provided. WO 2008071808 describes an entire system for implementing an ASP solution in the field. WO 2007011812 describes a mobile unit for another method of EOR by nitrogen flooding. The unit is comprised of a nitrogen generating unit and a pumping system that can deliver the generated nitrogen to the wellbore. Further it teaches the pumping of other well fluids concurrently with the nitrogen. US2004/034521 describes a three in one nitrogen, chemical, coiled tubing system on a mobile unit. U.S. Pat. No. 6,702,011 describes a mobile unit for delivery of nitrogen through coiled tubing.

Thus there is a need for a mobile technology which enables the injection of surfactant at a controlled concentration into a high pressure stream of liquid or supercritical $CO_2$.

SUMMARY OF THE INVENTION

In accordance with one aspect of the invention, there is provided an enhanced oil recovery apparatus for creating a wellbore fluid comprising supercritical $CO_2$ and a surfactant. The apparatus comprises a storage tank for containing a surfactant which is injected into the $CO_2$ stream, a pump for delivering surfactant to the $CO_2$ stream, means for injecting the surfactant into the $CO_2$ stream, and a feedback control for maintaining a constant concentration of surfactant in the supercritical $CO_2$ stream.

In accordance with a further aspect of the invention there is provided a method of enhancing oil recovery by creating a wellbore fluid for injection into an oil field by a mobile enhanced oil recovery apparatus comprising a storage tank, means for injecting surfactant into the supercritical $CO_2$ stream, and a feedback control for maintaining a constant concentration of surfactant in the supercritical $CO_2$ stream. The method comprises the steps of transmitting a surfactant to the injection pipe, injecting the surfactant into a supercritical $CO_2$ stream at a controlled rate, creating a wellbore fluid comprising the $CO_2$ and the surfactant, and injecting the wellbore fluid into the oil field. In the context of the invention, the wellbore fluid comprises the surfactant and a gas. The gas may be any number of gases commonly used for this purpose. Supercritical carbon dioxide is used as an example in the specification. In this context it should also be understood that the carbon dioxide may also be liquefied.

The invention provides a mobile method of delivering additives into high pressure supercritical $CO_2$ streams that can be employed as needed in the field. More specifically the invention relates to a mobile unit encompassing one or more surfactant storage tanks, high pressure pumps, a feedback control system for maintaining the desired surfactant injection rate based on the flow rate of the $CO_2$, a pressure relief system, heated surfactant storage, injection line and high pressure connection devices, and an electric generator, and fuel container. The surfactant may be thermally treated up to the point at which it is injected into the stream of supercritical $CO_2$.

Mobility, whether on land or at sea, is a great advantage to the claimed invention. Numerous benefits are provided, for example, prior to deployment to a new injection well location, this equipment can be loaded with fuel and surfactant at a central storage facility then deployed for the desired length of time on the given well. This significantly reduces the cost of large scale implementation of equipment dedicated to each and every injection well, and it minimizes environmental risks by, for example, conducting fuel and surfactant replenishment at a central, fit for purpose transload facility.

DETAILED DESCRIPTION OF THE PREFERRED EMBODIMENTS

As can be seen in FIGS. 1A through 1D, wherein all numbers designate like parts throughout several views of the invention there is shown one embodiment of a method of enhancing oil recovery by creating a wellbore fluid for injection into an oil field by a mobile enhanced oil recovery apparatus. The apparatus comprises a storage tank 12, means for injecting fluid 14 into a gas stream, and a pump having a feedback control 16 for maintaining a constant concentration of fluid in a gas stream, FIG. 1B. The apparatus may also comprise a fuel tank 20. The various elements of the apparatus of the invention may be interconnected by any number of tubing and piping systems.

Figure 1A:
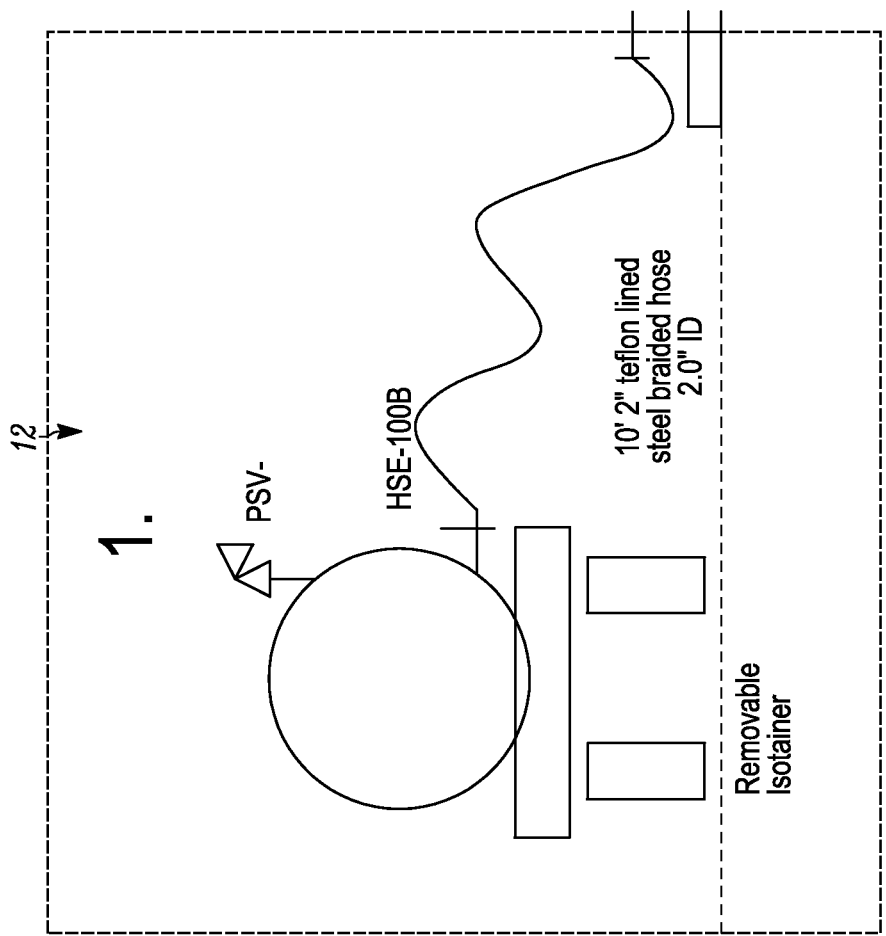
FIGS. 1A through 1D are schematic depictions of a method of injecting a wellbore fluid into an oil field in accordance with one embodiment of the invention.
Figure 1B:
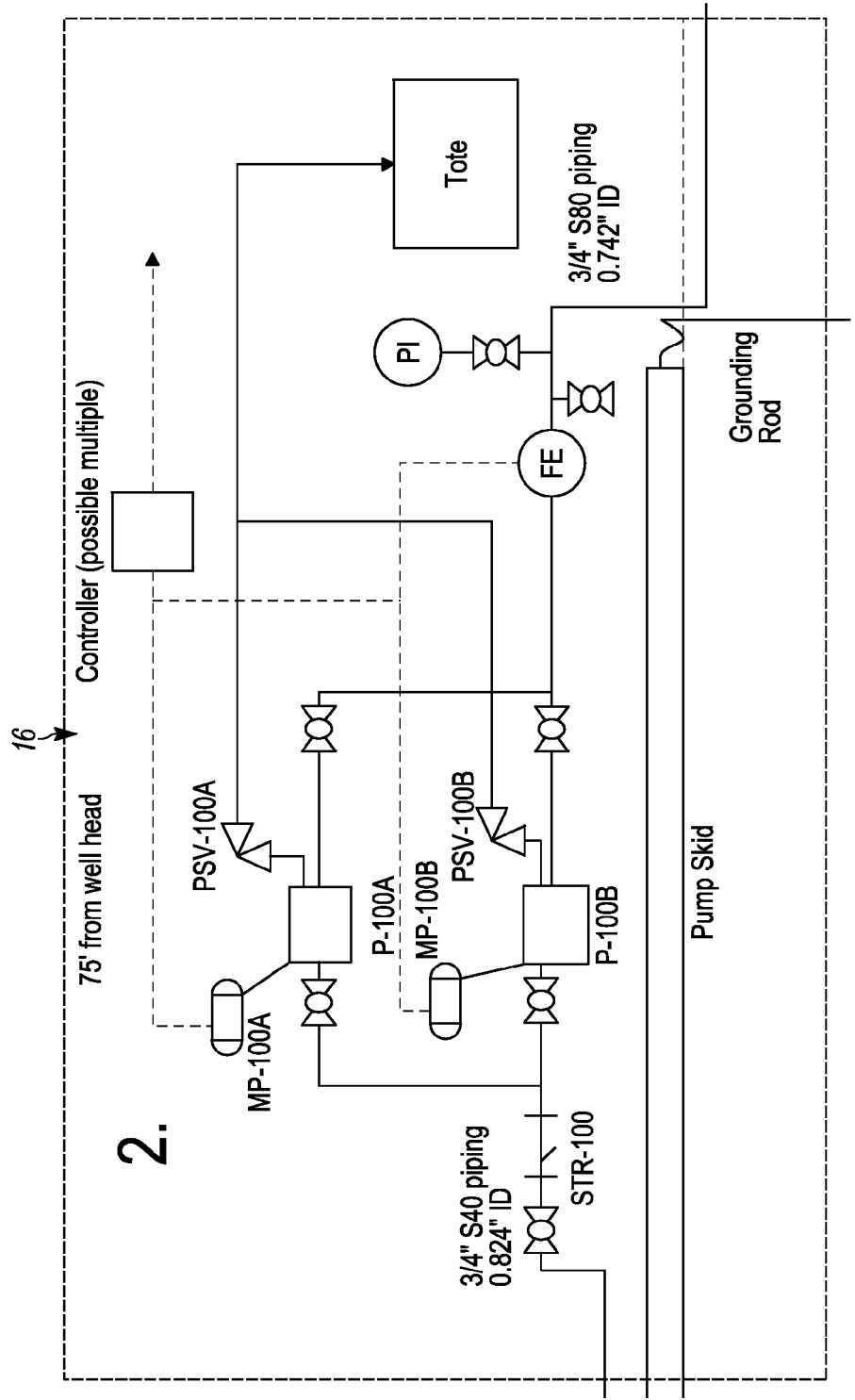

As can be seen in FIG. 1A, tubing, piping and hose may be used in accordance with the invention. Inner diameters may range from less than an inch to two inches or greater. Also, the tubing, piping or hose may be heated or cooled as necessary to prepare the surfactant for injection.

The method comprises the steps of injecting a surfactant into a supercritical $CO_2$ stream at a controlled rate creating a wellbore fluid comprising the supercritical $CO_2$ and surfactant and injecting the fluid into the oil field.

Containment

Generally, the invention comprises one or more containment vessels 12, FIG. 1A. The function of the container is to store surfactant. The container may also function to provide a site for processing the surfactant. Processing in this context means heating, cooling, agitating, pressurizing, etc. The containers may also be used as a site for the addition of any other constituents which may be desired to be intermixed with the surfactant.

To this end, the container may take any number of shapes and sizes. Some considerations which are relevant to the size and shape of the containment vessel include transportability, discharge and refill, material of construction, pressure relief protection, the overall function of the tank (containment and/or mixing), and the necessity for thermal processing among other factors.

Using a container that is portable enables transport. Consideration has to be given to the means of transport (for example rail or truck). The practical limitations of highway and rail line passage limit the size of certain containment vessels. Additionally, government regulations dictate that certain fill volume restrictions during transport also need to be complied with.

The size and shape of the vessel may also be determined by the use level of surfactant at the site of injection. Presently, vessels ranging in size from about 300 gallons to 36,000 gallons have been contemplated for use. Generally, containers of the size of about 500 to 6,000 gallons have been found most desirable. Containment vessels which provide agitation (stirring), heating and/or cooling may also be useful in accordance with the invention. When applying any type of thermal affect to a container, the size of the container has to be considered. Mixing times are also relevant. Heating may be conducted through use of resistance elements. Alternatively, closed loop heating and cooling systems may be used for circulating coolant/refrigerants or heating fluids.

Figure 2:
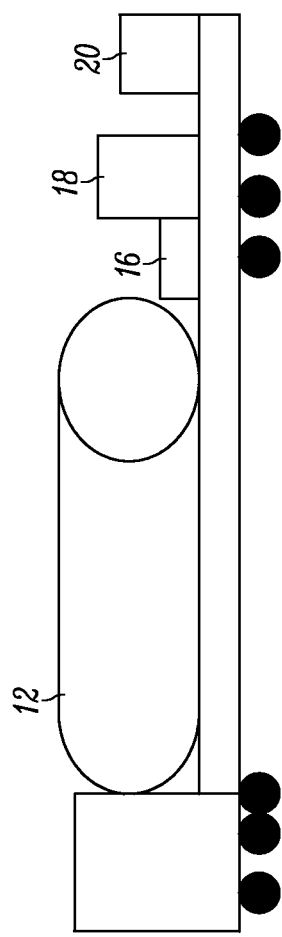
FIG. 2 is a schematic depiction of one embodiment of the invention depicted in FIG. 1 as alternatively shown as a mobile unit.

Containment vessels which are preferred include portable containers that may be on and off loaded from any number of wheeled vehicles including flat bed trailers and railcars, FIG. 2. These types of containers are widely regarded as "isotainers" and can take any number of shapes, styles, and sizes.

Surfactant Injection

Figure 1C:
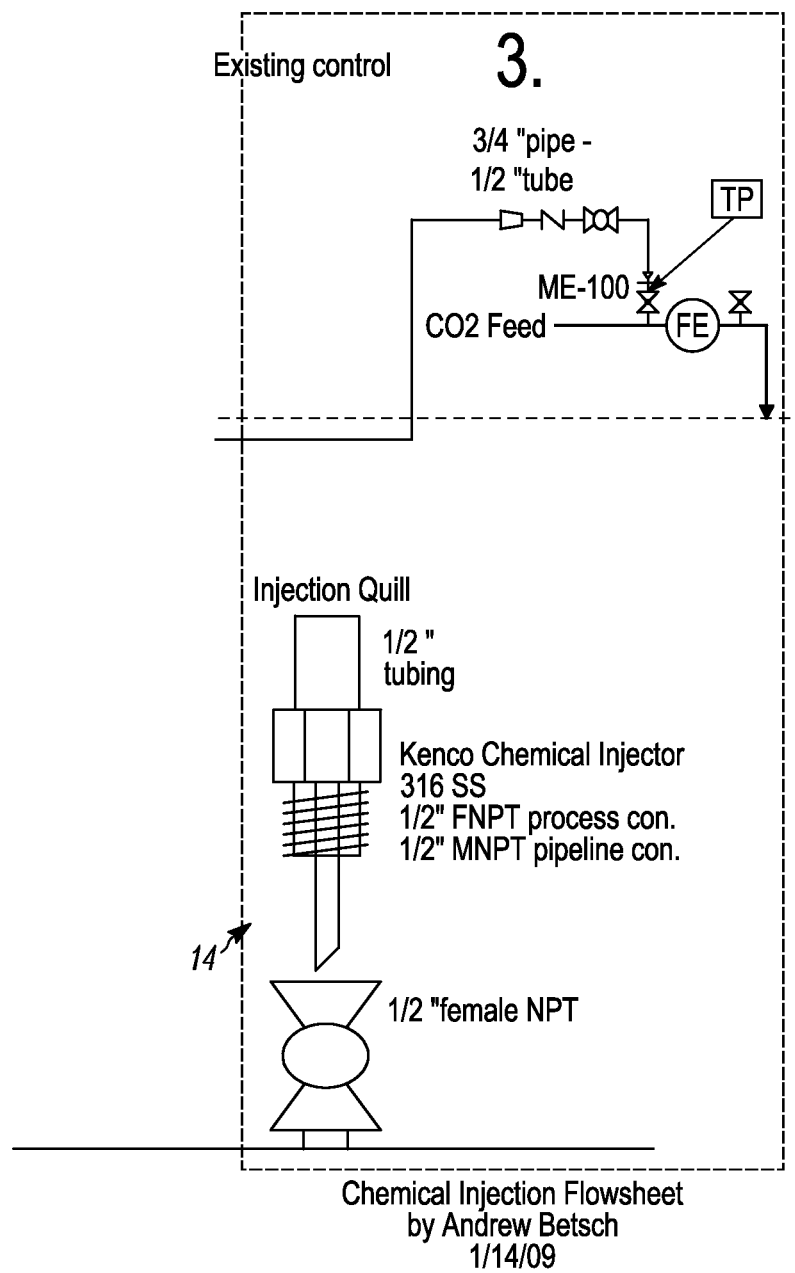

The invention comprises a surfactant injection system 14, FIG. 1C. Generally the surfactant injection system comprises an injection quill. The purpose of the injection quill is to facilitate miXing between the two process fluids, in this case surfactant and supercritical $CO_2$, delivered by the main header pipe and the quill. The quill generally injects surfactant at the center of the main header pipe in the form of a solid jet or spray. This processing of fluids (such as gases and/or supercritical liquids) allows the supercritical $CO_2$ and surfactant to mix thoroughly.

Generally, quills useful in the invention are those commercially available from any number of known sources. Materials used in the manufacture of quills tend to be alloys such as high alloy steel, carbon steel and stainless steel including Iconel®, Incolloy®, and Hastelloy®. Relevant considerations in choosing quills of any different material include corrosion resistance, thermal properties, acid resistance, flame resistance and overall strength. Material to these concerns are the types of fluids to be dispensed and the rate at which these fluids are dispensed from the quill.

Quills which have been found useful in accordance with the invention include Kenco Injectors such as models KINJ, and KINJM. The fluid velocity should be less than that which will damage the quill. For example, to avoid damage to the quill, fluid velocity in a 2" line should remain below 900 gals/min (assuming a 3" length from thread to tip). A common set of injection well parameters includes about 7000 bpd water in a 2" line with a flow rate of about 204 gals/min. With 20 MMscfd of $CO_2$ in a 2" line, the flow rate is about 200 gals/min.

An exemplary surfactant injection rate through a Kenco injector is about 240 gph. At a surfactant concentration of about 0.1 wt-%, and a supercritical $CO_2$ rate of 20 MMscfd, the quantity of surfactant injected will be approximately 13 gph.

Generally, the quill may be installed in relationship to the main header pipe in any number of fashions. Preferably, the quill is installed in the first ½ inch tie point upstream of the wellhead, prior to any flowline disruptions such as inline screens or inline chokes. Generally, quills such as Kenco KINJ-50 (1/2" NPT), -S6 (316 SS Steel), -L2 (2" length) and Kenco KINJ-S6-L3 have been found useful at this location. Generally, the quill length with a tip that most closely centers in the header pipe is preferred. Generally, the preferred quill is installed with a preferred orientation with the longest side of the quill upstream and with the quill tip at the center of the $CO_2$ line.

As shown in FIG. 1C, the quill is used to mix surfactant with supercritical $CO_2$. It is contemplated that the quill may be positioned in accordance with the invention in any number of configurations. For example, the quill may be positioned proximate the well head to inject surfactant into the supercritical $CO_2$ as close as possible to the wellhead. Alternatively, the quill may be positioned up stream from the wellhead, causing additional mixing of the surfactant with supercritical $CO_2$ well before the mixture enters the production/injection tubing. Also, as contemplated quills can be installed, either permanently or temporarily, at each well and can be connected to the pumping system when required. The quill does not need to be transported with the truck. In instances where more than one well is fed by a single tank 12, multiple lines may be used through multiple quills 14.

Flow Control

In one further aspect of the invention, an embodiment of the mobile EOR apparatus is provided which comprises a surfactant flow controller. The surfactant flow controller functions to monitor and maintain the flow of the surfactant into the supercritical CO2.

Flow of the supercritical $CO_2$ may vary or otherwise occur at an intermittent rate. Accordingly, to provide a wellbore fluid having a constant concentration of surfactant and supercritical $CO_2$ for permeating the oil field strata, the flow rate of the surfactant injected into the supercritical $CO_2$ need also be varied accordingly. Any number of devices may be used which provide this function.

Typical devices monitor surfactant flow rates in parts per million of flow rate and allow manual or automatic entry of set points. Any variety of flow meters may be used with the invention. The surfactant injection flow meters require a $CO_2$ flowrate signal from the supercritical $CO_2$ header in order to ratio the surfactant in the proper concentration to the varying rate of supercritical $CO_2$ being delivered to the well. The calibration procedure for such a unit is known to those of skill in the art. The surfactant flow rate will be dependent upon the supercritical $CO_2$ flow rate. Two useful flow controllers are those produced and sold by Baker Hughes under the Sentry II and Sentry Net 3 trademarks.

Pump and Power Supply

Figure 1D:
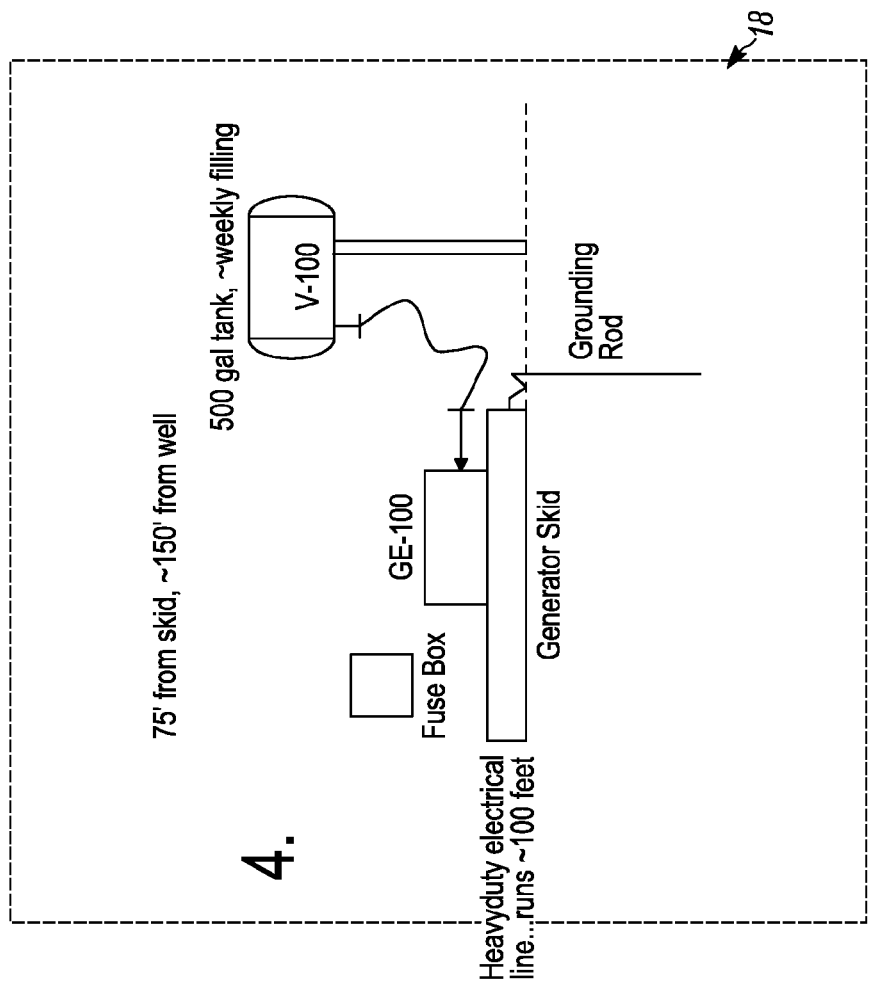

The invention also comprises a pump having a feedback control 16 for maintaining a constant concentration of fluid in a gas stream and a source of power such as a generator 18, FIG. 1D. Any type of pump may be used which is capable of providing pressure ranging from about 1000 psi to 3500 psi. The power source powers the surfactant injection pumps injecting the surfactant into the gas stream through the quill. Any type of generator may be used depending upon portability, power requirements, refueling, and running time, among other factors.

One generator which has been found useful is the 36 KW diesel powered generator made by Mulitquip Inc (supplied by Carrier). When fueled this generator weighs over 4000 lbs and consumes fuel at 2.7 gph @ 100% prime. A generator such as this usually has an internal fuel tank and may be provided with an auxiliary tank for less frequent resupply. In operation, the generator may provide from about 240 volts to about 480 volts at currents ranging from about 108 amps to 54 amps.

PROCESSING & EXPERIMENTAL

To enhance the effectiveness of the supercritical $CO_2$ flooding process, it has been suggested that a surfactant be added to the supercritical carbon dioxide to generate a foam in the formation. A foam can generate an apparent viscosity of about 100 to about 1,000 times that of the injected gas. Therefore, the foam can inhibit the flow of the supercritical $CO_2$ into that portion of the oil reservoir that has previously been swept. In other words, the foam can serve to reduce the tendency for the supercritical $CO_2$ to channel through highly permeable flissures, cracks, or strata, and direct it toward previously unswept portions of the subterranean formation. As such, the foam can force the supercritical $CO_2$ to drive the recoverable hydrocarbons from the less depleted portions of the reservoir toward the production well.

Nonionic surfactants are usually organic compounds that are amphiphilic, meaning they contain both hydrophobic groups (alkylated phenol derivatives, fatty acids, long-chain linear alcohols, etc.) and hydrophilic groups (generally ethylene oxide, propylene oxide and/or butylenes oxide chains of various lengths), therefore they can be soluble in both organic solvents (non-polar) and polar solvents such as water. For example, the nonionic surfactants useful in the invention can lower the interfacial tension between carbon dioxide (such as carbon dioxide in a supercritical state) and water. Nonionic surfactants are capable of dissolving in supercritical $CO_2$ in dilute concentrations, where they can help to stabilize carbon dioxide-in-water emulsions and/or foams (referred to herein as "foam"), discussed herein.

Examples of nonionic surfactants for the present disclosure include, but are not limited to, branched alkyphenol alkoxylates, linear alkylphenol alkoxylates, and branched alkyl alkoxylates. Specific examples of such nonionic surfactants can be found in "$CO_2$-Soluble Surfactants for Improved Mobility Control" authored by Xing et al. (Society of Petroleum Engineers, SPE 129907, presented at the 2010 SPE Improved Oil Recovery Symposium, Tulsa Okla., 24-28 Apr. 2010), which is incorporated herein by reference in its entirety.

In one or more embodiments, examples of surfactants useful with the present disclosure can also be found in U.S. Pat. No. 6,686,438 to Beckman and U.S. Pat. No. 5,789,505 to Wilkinson, and the U.S. patent application entitled "Compositions for Oil Recovery and Methods of Their Use," U.S. Pat. Application Ser. No. 61/196,235, which are incorporated herein by reference.

Generally this surfactant may be stored at the site of use in a containment vessel 12. In storage, the surfactant may be in solution ranging in concentration from about 40 wt-% to 100 wt-%. Depending upon the ambient temperature of application any number of diluents may be used to protect the surfactant from freezing. If an appropriate diluent is not used for the ambient conditions, it may be necessary to provide auxiliary heating to the surfactant storage vessel and any lines through which the surfactant flows to avoid freezing. For example, diluents may be used to adjust the freeze point of the surfactants to range from about −40° F. to 50° F.

While the rate of injection of the surfactant into the supercritical $CO_2$ stream may vary, generally, surfactant is injected into the $scCO_2$ stream at a rate creating a concentration of liquid (surfactant) in the wellbore fluid ranging from about 100 to 5,000 ppm.

The injection system that will be utilized will be flexible in its surfactant volume capability. It should be designed to pump surfactant in varying concentrations to allow for reservoir Response. In one example, at the minimum expected $CO_2$ rate of 7MMscfd, up to 3 times the recommended surfactant concentration can be delivered.

One example of a scheme for correctly determining the pump sizing for a given injection well is provided in Table 1 in the figure below.

The table lists the gallon per hour rates that need to be delivered to the CO2 stream to maintain the desired concentration in ppm. The maximum CO2 flow rate of the injection well as well as the expected minimum rate will determine the range of pump rates necessary. As is understood in the art the CO2 rate is determined based on standard temperature and pressure, and the surfactant concentration may need to be adjusted for diluents. This table is an example and other flow rates and concentrations are not excluded.

TABLE 1

| Sufactant Wt % | Gallons per Hour | | | | | | | |
|---|---|---|---|---|---|---|---|---|
| | 25 MMCD | 22.5 MMCFD | 20 MMCFD | 17.5 MMCFD | 15 MMCFD | 12.5 MMCFD | 10 MMCFD | 7.5 MMCFD |
| 0.30% | 49.7 | 44.7 | 39.7 | 34.8 | 29.8 | 24.8 | 19.9 | 14.9 |
| 0.25% | 41.4 | 37.3 | 33.1 | 29.0 | 24.8 | 20.7 | 16.6 | 12.4 |
| 0.20% | 33.1 | 29.8 | 26.5 | 23.2 | 19.9 | 16.6 | 13.2 | 9.9 |
| 0.15% | 24.8 | 22.4 | 19.9 | 17.4 | 14.9 | 12.4 | 9.9 | 7.5 |
| 0.10% | 16.6 | 14.9 | 13.2 | 11.6 | 9.9 | 8.3 | 6.6 | 5.0 |
| 0.05% | 8.3 | 7.5 | 6.6 | 5.8 | 5.0 | 4.1 | 3.3 | 2.5 |

NOTES:
Surfactant volumes based on 90% active (calculated injected volume 1.1 times the wt percent listed)
New location injection rates range from 12 MM-18 MM/day. Plan for 10% more worse case yields up to 20 MM/day.
PQ Test  Dual Pump 100% output at 1500 psi =   542 gpd w/Surfactant   505 gpd w/40-D300
                                              22.6 gph w/Surfactant   21.0 gpd w/40-D301
PQ Test  Dual Pump 10% output at 1500 psi =    20 gpd w/Surfactant    32 gpd w/40-D301
                                              0.8 gph w/Surfactant    1.3 gpd w/40-D301
PQ Test  We should expect that at 2200 psi, rates will be <500 gpd
SG =     1.0237

Figure 3:
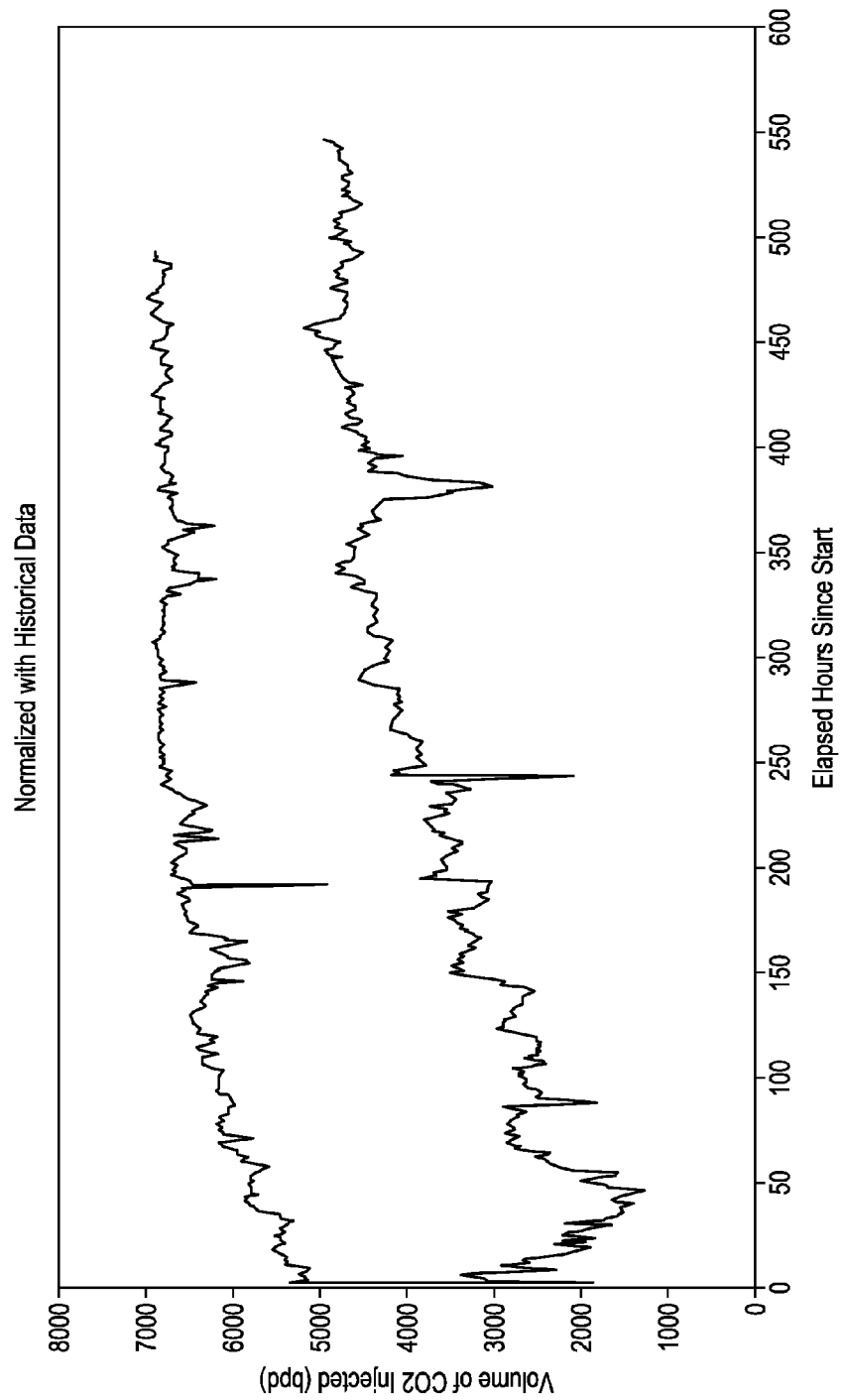
FIG. 3 is a graphical representation of the injection rate of $CO_2$ versus time, for two $CO_2$ injection cycles.

On the graph in FIG. 3 the injection rate of CO2 is plotted vs time for two CO2 injection cycles in the same injection well following injections of water of equal length for comparison. The top line is typical of the CO2 response after a water cycle. The CO2 rate quickly increases upon switching and then gradually ascends over the course of about 10 days to plateau.

The lower line shows the effect of the foam/emulsion surfactant in accordance with the inventions. By injecting 1200 ppm of surfactant in the CO2 the injection rate starts off by decreasing as the foam bank is established. Then a very slow steady rise occurs in the injectivity as the foam is propagated away from the well bore in a radial fashion. The variability in $CO_2$ injection rate is also evident from the graph on FIG. 3.

Although the present invention has been described by reference to its preferred embodiment as is disclosed in the specification and drawings above, many more embodiments of the present invention are possible without departing from the invention. Thus, the scope of the invention should be limited only by the appended claims.

The claimed invention is:

1. A method of enhancing oil recovery by creating a wellbore fluid for injection into an oil field comprising a plurality of strata, said method comprising the steps of:
   a. receiving a flow rate signal from a gas stream comprising a gas;
   b. injecting a surfactant into said gas steam at a controlled rate, wherein said controlled rate is determined from said flow rate signal;
   c. creating a fluid comprising said gas and said surfactant; and
   d. injecting said fluid into said oil field strata;
   wherein said surfactant is injected into said gas stream via an injection quill comprising a tip having a longer side and a shorter side;
   wherein the concentration of said surfactant in said wellbore fluid is maintained between a range from about 100 ppm to 5000 ppm;
   wherein said gas comprises supercritical $CO_2$; and
   wherein said injection quill is installed with said tip proximate to the center of said gas stream.

2. The method of claim 1 wherein said injection quill is installed with said longer side of tip upstream of said shorter side of said tip.

3. A method of enhancing oil recovery by creating a wellbore fluid for injection into an oil field comprising a plurality of strata, said method comprising the steps of:
   a. receiving a flow rate signal from a gas stream comprising a gas;
   b. injecting a surfactant into said gas steam at a controlled rate, wherein said controlled rate is determined from said flow rate signal;
   c. creating a fluid comprising said gas and said surfactant; and
   d. injecting said fluid into said oil field strata;
   wherein said surfactant is injected into said gas stream via an injection quill comprising a tip having a longer side and a shorter side;
   wherein the concentration of said surfactant in said wellbore fluid is maintained between a range from about 100 ppm to 5000 ppm;
   wherein said gas comprises supercritical $CO_2$; and
   wherein said injection quill is installed with said longer side of tip upstream of said shorter side of said tip.

* * * * *